US000001519H

United States Statutory Invention Registration [19]

[11] Reg. Number: H1519

Semple

[45] Published: Mar. 5, 1996

[54] TRANSPARENT CERAMIC COMPOSITE ARMOR

[75] Inventor: Charles W. Semple, Everett, Mass.

[73] Assignee: The United States of America as represented by the Secretary of the Army, Washington, D.C.

[21] Appl. No.: 522,788

[22] Filed: Jan. 24, 1966

[51] Int. Cl.[6] ..... F41H 5/26

[52] U.S. Cl. ..... 89/36.02; 428/911; 501/108; 501/127

[58] Field of Search ..... 89/36, 36.5, 36.01, 89/36.02, 36.11; 109/49.5, 80, 81, 84; 161/404; 106/58, 65; 428/412, 911; 501/108, 127, 153

[56] References Cited

U.S. PATENT DOCUMENTS 3,700,534 10/1972 Cook ..... 89/36.02
3,722,355 3/1973 King ..... 89/36.02

*Primary Examiner*—Stephen C. Bentley
*Attorney, Agent, or Firm*—Freda L. Krosnick; Muzio B. Roberto; Frank J. Dynda

[57] ABSTRACT

Transparent ceramic armor consisting of a light weight composite formed by utilizing a face plate of transparent aluminum oxide or transparent magnesium oxide with a back-up plate of transparent plastic and the two plates bonded together with a transparent adhesive. This composite on test affords complete ballistic protection against 0.30 AP M2 projectiles at 0° obliquity with a muzzle velocity of 2770 ft. per sec.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CERAMIC ARMOR COMPOSITES

Cal. .30 AP M2 Projectile @ 0° Obliquity Muzzle Vel. 2770 f.p.s.

| COMPOSITE TRANSPARENT | FACE PLATE TRANSPARENT | BACKUP TRANSPARENT | TOTAL AREA DENSITY | $V_{50}$ PROTECTION B.L. |
|---|---|---|---|---|
|  | .50" THICK MgO | .75" THICK LEXAN | 14.0 Lbs/ft² | 3220 f.p.s. |

CERAMIC ARMOR COMPOSITES
Cal. .30 AP M2 Projectile @ 0° Obliquity Muzzle Vel. 2770 f.p.s.
| COMPOSITE TRANSPARENT | FACE PLATE TRANSPARENT | BACKUP TRANSPARENT | TOTAL AREA DENSITY | $V_{50}$ PROTECTION B.L. |
|---|---|---|---|---|
| 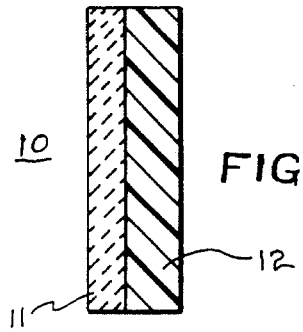 FIG. 1 | .50" THICK MgO | .75" THICK LEXAN | 14.0 Lbs/ft$^2$ | 3220 f.p.s. |
| 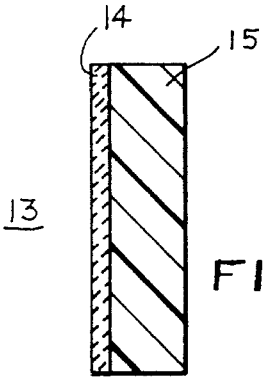 FIG. 2 | .250" THICK $Al_2O_3$ | 1.00" THICK LEXAN | 11.4 lbs/ft$^2$ | 2435 f.p.s. |
| 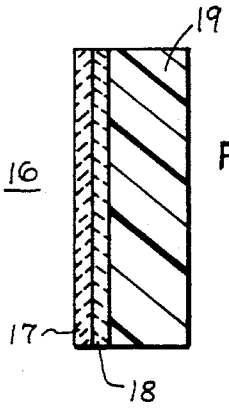 FIG. 3 | TWO .250" THICK $Al_2O_3$ | 1.00" THICK LEXAN | 16.4 lbs/ft$^2$ | 3820 f.p.s. |

TRANSPARENT CERAMIC COMPOSITE ARMOR

SPECIFICATION

This invention relates to transparent ceramic armor designed to provide light weight ballistic protection primarily for aircraft against armor piercing projectiles.

Presently available transparent armors are inefficient in providing ballistic protection due to their inability to induce severe projectile shatter and their tendency to crack on impact.

It is the object of this invention to obtain adequate protection by shattering small arms projectiles with a light weight composite armor having a hard transparent ceramic face plate bonded by a transparent adhesive to a tough resilient transparent plastic back-up plate.

It is also the object of this invention to utilize this shattering of the projectile by the face plate which spreads the impact force per unit area to reduce the requirements of the back-up plate, in that the excess energy per unit area to be absorbed by the back-up plate is proportionately lessened.

This particular transparent armor has been designed and tested to afford complete protection against caliber 0.30 AP M2 projectiles with a muzzle velocity of 2770 f.p.s., but obviously could be engineered for other and larger projectiles.

A composite material that will meet these requirements was constructed with commercially available materials using as the material for the face plate, transparent magnesium oxide or aluminum oxide with a back-up plate of a transparent plastic a polycarbonate resin such as "Lexan" and the two plates were bonded together with a transparent adhesive. Other types of transparent plastic backing materials such as glass, plexiglass, fiberglass, lucite etc., can be used in either a monophasic or multiphasic form.

The drawing illustrates the composition and dimensions of the transparent armor plates actually tested, together with the protection afforded by recording the ballistic limit of each, in which:

FIG. 1 is a composite of transparent armor 10, in which the face plate 11 is transparent magnesium oxide, 0.50" thick, bonded with a transparent adhesive (not shown) to a back-up plate 12 of transparent plastic "Lexan", 0.75" thick, has an area density of 14 pounds per square foot and provides a ballistic limit of 3220 f.p.s. for protection;

FIG. 2 is a composite of transparent armor 13 in which the transparent face plate 14 is aluminum oxide, 0.250" thick, bonded with a transparent adhesive to a back-up plate of transparent "Lexan" 1.00" thick, has an area density of 11.4 pounds per square foot and provides a ballistic limit of 2435 f.p.s. which is not satisfactory for protection against a projectile with a muzzle velocity of 2770 f.p.s. This deficiency may be corrected by increasing slightly the thickness of the face plate, such as 0.10";

FIG. 3 is a composite of transparent armor 16 in which the transparent face plate is made up of two transparent plates 17 and 18 of aluminum oxide each 0.250" thick with a transparent back-up plate 19 of "Lexan" 1.00" thick, all plates being bonded together with a transparent adhesive (not shown) and having an area density of 16.4 pounds per square foot which has a ballistic limit of 3820 f.p.s. for protection.

The composite armor of this invention is designed to meet the requirements of ballistic protection with light weight ceramic material that is completely transparent and has an improved capability of protection as compared to standard steel armor of equal areal density.

This comparison is shown in the following table in which competent ballistic protection is provided against caliber 0.30 AP M2 projectiles with a muzzle velocity of 2770 feet per second:

Areal Density 30 pounds per square foot for Laminated Glass 20 pounds per square foot for High Hardness Steel 10 pounds per square foot for Opaque Ceramic Composites 14–16.4 pounds per square foot for Translucent Ceramic and Plastic Back-up 14–16.4 pounds per square foot for Transparent Ceramic and Plastic Back-up Areal density is a term used particularly in armor evaluation. Also where the same materials are translucent and are employed in the composite armor, it should be noted that due to the elastic constant and the accoustical velocity determinations that the results sought are practically identical with that of the transparent plates.

What is claimed is:

1. Transparent ceramic armor comprising a light weight composite of transparent material adapted to shatter on impact projectiles with a muzzle velocity of approximately 3000 f.p.s., consisting of a transparent ceramic face plate backed by a transparent plastic plate and bonded thereto with a transparent adhesive so constructed and arranged that the light weight composite affords complete ballistic protection against projectiles with a muzzle velocity of 3000 f.p.s. or less.

2. Transparent ceramic armor comprising, a light weight composite of transparent material adapted to shatter small arms projectiles on impact, consisting of a transparent facing of magnesium oxide adapted to spread the impact force of a projectile and bonded with a transparent adhesive to a transparent plastic backing adapted to absorb any excess energy from impact on face plate, said backing reduced both in ballistic requirement and in weight by the greater distribution of the impact force by the face plate whereby the composite provides improved protection with transparent armor over standard steel armor of equal areal density.

3. Transparent ceramic armor comprising, a light weight composite of transparent material adapted on impact to shatter projectiles with a muzzle velocity of approximately 3000 f.p.s., consisting of a transparent face plate of magnesium oxide adapted on impact to spread and reduce the impact force per unit area and bonded with a transparent adhesive to a transparent plastic backup plate as a safety factor to absorb excess energy of the impact together with fragments of the face plate and the projectile so constructed and arranged that the requirements of the back-up plate are materially reduced by the reaction of the face plate in reducing the impact force per unit area to permit the light weight composite provide complete ballistic protection against projectiles with a muzzle velocity of 3000 f.p.s. or less.

4. Transparent ceramic armor comprising, a light weight composite of transparent material with an areal density of 14.0 pounds per square foot adapted to shatter on impact projectiles with a muzzle velocity of approximately 3000 f.p.s., consisting of a transparent face plate of magnesium oxide 0.50" thick adapted on impact to spread and reduce the impact force per unit area and bonded with a transparent adhesive to a transparent plastic back-up plate 0.75" thick adapted to absorb less excess energy per unit area due to the greater distribution of impact force per unit area by the face plate whereby the light weight composite provides improved protection with transparent armor over standard steel armor of equal areal density.

5. Transparent ceramic armor comprising, a light weight composite of transparent material with an areal density 16.4 pounds per square foot adapted to shatter on impact projectiles with a muzzle valocity of approximately 3000 f.p.s., consisting of a transparent laminated face plate of two plates of aluminum oxide each 0.250" thick adapted on impact to spread and reduce the impact force per unit area and bonded with a transparent adhesive to a transparent plastic back-up plate 1.00" thick adapted to absorb less excess energy per unit area due to the greater distribution of the impact force per unit area by the face plate so constructed and arranged that the light weight composite provides improved ballistic protection with transparent armor over standard steel armor of equal areal density.

6. A transparent ceramic armor comprising a light weight composite of transparent material adapted to shatter on impact projectiles with a muzzle velocity of approximately 3000 f.p.s., consisting of a transparent face plate of aluminum oxide 0.5" thick adapted on impact to spread and reduce the impact force per unit area and bonded with a transparent adhesive to a transparent plastic back-up plate 1.00" thick reduced in ballistic requirement by the greater distribution of the impact force on the face plate so constructed and arranged that the light weight transparent composite has an areal density not exceeding 16.5 pounds per square foot and provides complete ballistic protection against projectiles with a muzzle velocity of 3000 f.p.s. or less.

* * * * *